May 5, 1953 J. P. SHANKLIN 2,637,815
COMBINATION LOCALIZER AND SWAMPING ANTENNA
Filed March 31, 1950 3 Sheets-Sheet 1
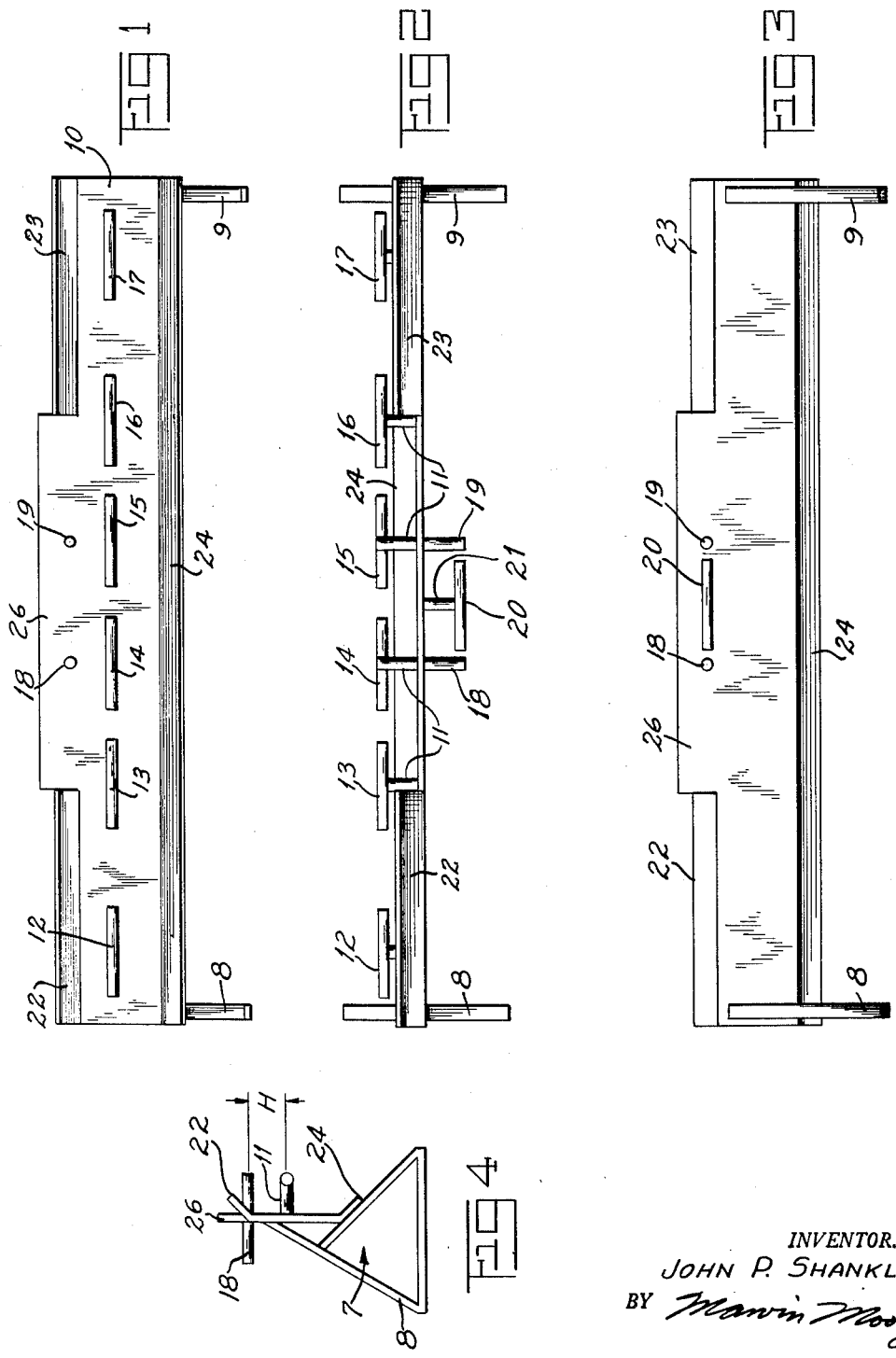
INVENTOR.
JOHN P. SHANKLIN
BY Marvin Moody
ATTORNEY

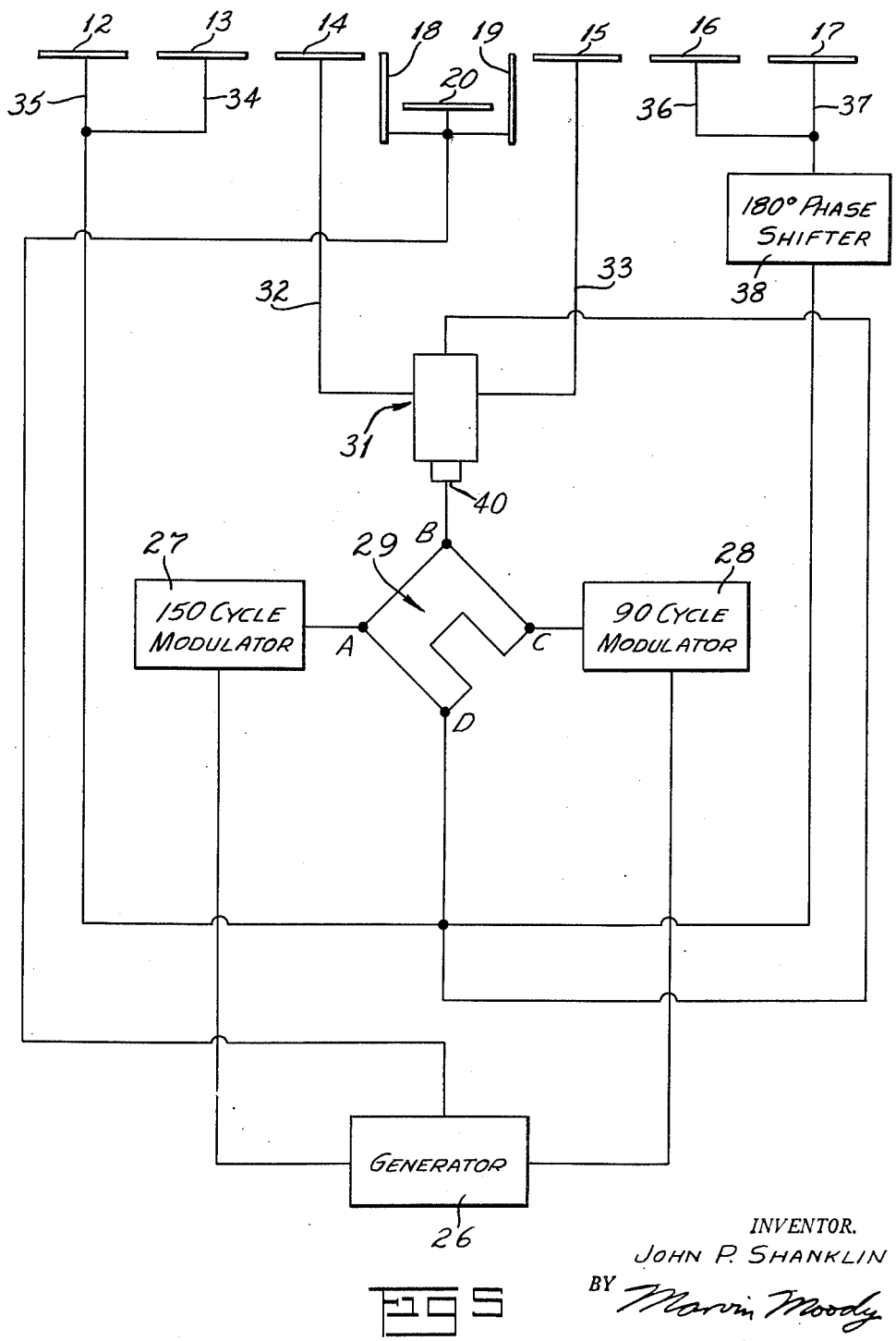

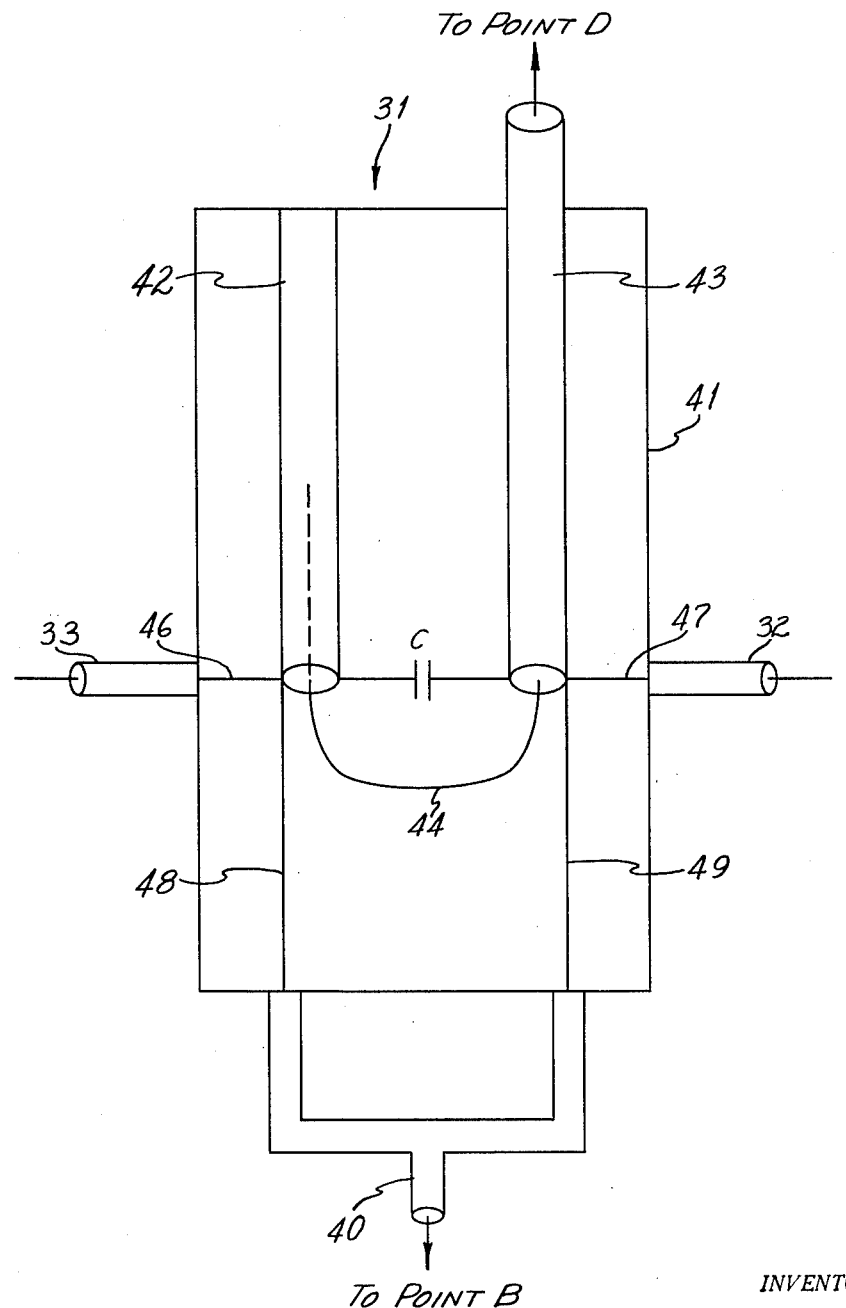

Patented May 5, 1953

2,637,815

UNITED STATES PATENT OFFICE 2,637,815

COMBINATION LOCALIZER AND SWAMPING ANTENNA

John P. Shanklin, Cedar Rapids, Iowa, assignor to Collins Radio Co., Cedar Rapids, Iowa, a corporation of Iowa Application March 31, 1950, Serial No. 153,163

6 Claims. (Cl. 250—33.57)

This invention relates to an antenna combination which may be used to describe a localizer path, and combines the features of the localizer antenna with a swamping antenna.

As the use of aircraft has become more and more common, the landing and taking off under conditions which make the visibility practically zero, has resulted in the need for aids to the pilot. Much apparatus has been developed, and at the present time the so-called "localizer-glide path system" is most commonly used for blind landings. In this system a beam of radiant energy is radiated into the area above the runway and extending outwardly therefrom. This radiant energy has the characteristic that demodulating means on the aircraft can indicate to the pilot when he is flying at the right geographic position relative to course. Usually the information is presented to the pilot on a zero center meter which, when centered, indicates to the pilot that he is making the correct landing approach, but which, if off to one side, indicates to him that he must turn or change his direction of travel to hit the runway. This is the so-called localizer portion of the landing system. A similar system indicates to the pilot the altitude which he should maintain while making his approach. If he is above or below the desirable path, a needle will point out this fact. The manner of defining the on-course signal is to generally radiate a pair of signals which are modulated by different frequencies as, for example, 150 or 90 cycles. Alternatively, the modulation may be the same frequency with the polarity reversed by 180 degrees. In order to accurately define the equi-signal path, it is usually desirable to make use of a so-called swamping antenna in combination with the localizer antenna. This swamping antenna has heretofor been placed behind the localizer antenna. Its object is to describe a generally cardioid carrier frequency pattern which will substantially block out and attenuate any spurious and undesired equi-signal zones which occur. A disadvantage of placing the swamping antenna behind the localizer antenna is that as the distance between the two antennae changes with azimuth, the phase relationship betwen the two radiated signals will change. This causes undesired distortion.

It is an object of this invention, therefore, to provide a combined localizer and swamping antenna wherein the swamping antenna is attached directly to the localizer antenna.

Another object of this invention is to provide an improved localizer antenna which will minimize spurious equi-signal zones.

Yet another object of this invention is to provide a new and novel means for feeding a combined localizer-swamping antenna.

A feature of this invention is found in the provision for an antenna support member having a vertical shield member supported thereon and with a plurality of radiant members connected to one side of the antenna for describing a localizer path and a swamping antenna attached to said vertical member with a portion of the swamping antenna being connected to the opposite side of the vertical member and with other portions of the swamping antenna extending transversely through the vertical member at right angles to the radiating portion of the localizer antenna.

Further objects, features, and advantages of this invention will become apparent from the following description and claims when read in view of the drawings, in which:

Figure 1 is a front orthographic view of the combination antenna of this invention.

Figure 2 is a top view of the antenna shown in Figure 1.

Figure 3 is a rear view of the antenna illustrated in Figure 1.

Figure 4 is an end view of the antenna illustrated in Figure 1.

Figure 5 is a schematic view of the feeding means for the antenna illustrated in Figure 1; and, Figure 6 is a detailed view of the impedance matching device of this invention.

Figure 1 shows a supporting member 7 which comprises a pair of triangular legs 8 and 9. It supports a vertical member 10 of a generally rectangular shape which has mounted thereon by the transverse support members 11, a plurality of dipoles 12, 13, 14, 15, 16 and 17. These six dipoles radiate the localizer signal and are of a type well known to those skilled in the art. It is to be understood, of course, that as many dipoles as desired may be added longitudinally of the member 10. The dipoles 12–17 have modulation side bands fed thereto. 90 and 150 cycle modulation side bands may be supplied to dipoles 12, 13 and 14, and the same thing with reversed polarity may be supplied to the dipoles 15, 16 and 17. The two center dipoles 14 and 15 have fed thereto partially modulated carrier wave, also. The manner of feeding both the side bands and the partially modulated carrier to these two dipoles will be explained in detail later.

Assuming that the above described equipment constitutes a complete operatable localizer antenna structure, it is desirable to be able to prevent spurious equi-signal zones by the use of a swamping antenna. Extending transversely through the vertical member 10 are a pair of dipoles 18 and 19. As shown in Figure 1, they are vertically offset from the dipoles 14 and 15 so as to reduce interference between the members. Attached to the rear of the vertical member between the dipoles 18 and 19 is a dipole 20. The dipole 20 is supported by a support member 21 which offsets it from the vertical member 10. The three dipoles 18, 19, and 20 may be thought of as a very high frequency loop with one of the four dipoles removed. The vertical member 10 is a conductor and thus forms a screen so that the antenna 20 will radiate only rearwardly from the vertical member 10. The three dipoles 18, 19, and 20 will radiate a cardioid pattern. The conducting vertical member 10 may produce a notch in the cardioid pattern. However, this is desirable as the localizer antenna dipoles do not radiate right off their ends.

The swamping antenna is fed unmodulated carrier wave in phase with the carrier wave fed to the center dipoles 14 and 15, and because the two sets of dipoles 18 and 19, and 14 and 15, which are on the same side of the vertical member are at right angles to each other, there will be no transfer of swamping carrier signal into the localizer antenna feed line. The vertical separation H of the two antennas also prevents undesirable interference between the two antennas. Since the swamping antenna is located at the same geographic position as the localizer antenna, their electrical centers of radiation will coincide and the signals will remain in phase regardless of azimuth angle.

The ends 22 and 23 of the vertical member 10 are bent toward the localizer dipoles to increase the focusing characteristics of the localizer antenna. Likewise, the bottom portion 24 of the vertical member 10 is bent toward the localizer dipoles to increase the focusing. The center section 26 of the vertical member 10 is not bent toward the localizer dipole because it is used as mechanical support and radiating surface for both the localizer antenna and the swamping antenna.

The manner in which the antenna is fed is shown in Figure 5. A carrier frequency generator 26 feeds the swamping antenna comprising dipoles 18, 19, and 20. A modulator 27 receives energy from the generator 26 to modulate it with 150 cycles. A second modulator 28 receives an output from the generator 26 and modulates it with 90 cycles. A balanced bridge 29 has the output of modulator 27 connected to point A and the output of modulator 28 connected to point C. The leg DC has a half-wave more length than the other legs of the bridge, and thus the output from point D contains only the side band frequencies from the two modulators 27 and 28. The carrier frequency is not present at point D because the extra half wave length in the leg DC causes cancellation of the carrier. The output from point B contains the carrier wave and also approximately one-half of the side band energy caused by the 90 and 150 cycle modulation. The remainder of the side band energy appears at point D. An impedance matching device designated as 31 receives an input from point B and a second input from point D of the bridge 29. The output of the impedance matching device 31 is fed to the center dipoles 14 and 15. The lead 32 contains the side bands of modulation and the carrier frequency which is supplied to dipole 14. The lead 33 supplies side bands of modulation and carrier to the dipole 15. The side bands of modulation which came from point D of bridge 29 are fed to dipoles 14 and 15 in reversed polarity, whereas the carrier and side bands which came from point B of bridge 29 are fed in phase. This is accomplished by the impedance matching device 31 shown in Figure 6.

An input from point B is fed through a coaxial line to a Y-joint 40. A metallic casing 41 which may be rectangular in shape, for example, contains therein the hollow cylindrical stub line 42 which is slightly less than one-quarter wave length of the carrier frequency. The input from point D of the bridge 29 extends into the confines of the casing 41 to form the stub line 43 which terminates adjacent the end of the stub line 42. The center conductor 44 of the stub line 43 extends into the interior of the stub line 42. The center conductor 46 of the conductor 33 extends to the stub line 42 and connects thereto. Likewise, the center conductor 47 of line 32 connects to the external conductor of the stub line 43. The center conductors 48 and 49 extend into the casing and connect with the outer conductors of the stub lines of the conductors 42 and 43, respectively. The input from point B is fed to the impedance matching device 31 through the Y-joint 40 and emerges from the conductors 32 and 33 in phase. The side bands of modulation fed to the impedance matching device 31 from point D emerge at the lines 32 and 33 in reversed polarity.

Therefore, side bands from point D are fed to dipoles 14 and 15 in reversed polarity because of the impedance matching device 31 and the carrier and side bands from point B are fed to dipoles 14 and 15 in phase.

The system may also be used in a phase localizer, which may use 30 cycles to modulate the carrier wave in both modulators 27 and 28 with the modulation in 27 being 180 degrees out of phase with that in modulator 28. The remainder of the circuit will be identical, except that a 30 cycle phase reference signal must be transmitted through a second channel of communication.

Thus means are provided for feeding the antenna with the correct respective phase relationship.

A modification of this invention may be made so that it becomes a bi-directional antenna. If the shield 10 and the swamping dipole 20 are removed, the antenna will radiate in the forwardly and rearwardly directions. The swamping dipoles 18 and 19 at right angles to the localizer antenna will reduce undesired end radiation but energy will not be coupled between them due to the right angle placing.

It is seen that this invention provides a localizer-swamping antenna combination which has the advantage that the correct centers of radiation from the swamping and localizer antennas will remain in phase regardless of azimuth angle.

Although this invention has been described with respect to particular embodiments thereof, it is not to be so limited as changes and modifications may be made therein which are within the full intended scope as defined by the appended claims.

I claim:

1. A combination antenna comprising, a vertical shielding member, a plurality of parallel dipoles mounted longitudinally along one side of said shielding member, a pair of transverse dipoles extending through said shielding member, a rear dipole mounted parallel to said shielding member between said transverse dipoles and supported on the side opposite to the plurality of dipoles, and supporting means holding said vertical member in a predetermined spatial relationship with the surface of the earth.

2. A combination antenna comprising a shield member, a plurality of parallel dipoles mounted longitudinally of said shield and laterally offset therefrom, a pair of transverse dipoles extending through said shield member, a rear dipole parallel to said shield and laterally offset therefrom on the opposite side of the said plurality of dipoles, and supporting means connected to said shield.

3. A combination antenna comprising a vertically supported shielding member, a first dipole mounted parallel to said shielding member and laterally offset therefrom, a second dipole mounted on said shielding member parallel to said first dipole and laterally offset therefrom, a third dipole extending transversely through said shielding member adjacent said first dipole, a fourth dipole extending transversely through said shielding member adjacent said second dipole, a fifth dipole mounted parallel to said shielding member between the ends of said third and fourth dipoles and on the opposite side of said shielding member to the first and second dipoles.

4. A combination antenna comprising a shield member, a plurality of radiating dipoles substantially parallel to each other supported on said shield, a pair of dipoles extending transversely through said shield member and offset from said plurality of dipoles, a rear dipole mounted on the rear side of said shield member parallel to the plurality of dipoles on the opposite side of the shield member.

5. A combination antenna comprising, a supporting member, an electrically conducting vertical member mounted on said supporting member, a plurality of dipoles mounted longitudinally along one side of said vertical member and in axial alignment, a pair of transverse dipoles extending through said vertical member, and a rear dipole mounted to said vertical member parallel thereto and on the side opposite the plurality of dipoles.

6. A combination antenna comprising, a supporting member, an electrically conducting vertical member mounted on the supporting member, a plurality of dipoles mounted longitudinally along one side of said vertical member and in axial alignment, a pair of transverse dipoles extending through the vertical member, a rear dipole mounted between the transverse dipoles on the rear side of said vertical member, a bottom portion of said vertical member curved forwardly toward said plurality of dipoles, and upper end portions of said vertical member curved forwardly toward said plurality of dipoles.

JOHN P. SHANKLIN.

References Cited in the file of this patent

UNITED STATES PATENTS

| Number | Name | Date |
|---|---|---|
| 2,095,083 | Renatus | Oct. 5, 1937 |
| 2,160,853 | Gerhard et al. | June 6, 1939 |
| 2,212,238 | Kolster | Aug. 20, 1940 |
| 2,270,130 | Laport | Jan. 13, 1942 |
| 2,279,031 | Cockrell et al. | Apr. 7, 1942 |
| 2,287,533 | Peterson | June 23, 1942 |
| 2,419,672 | Busignies | Apr. 29, 1947 |